United States Patent
Tamminen et al.

(10) Patent No.: US 9,715,478 B2
(45) Date of Patent: Jul. 25, 2017

(54) METHOD FOR DETECTING THE CORRECT ROTATIONAL DIRECTION OF A CENTRIFUGAL APPARATUS, AND A CENTRIFUGAL APPARATUS ASSEMBLY

(71) Applicant: ABB Oy, Helsinki (FI)

(72) Inventors: Jussi Tamminen, Lappeenranta (FI); Tero Ahonen, Lappeenranta (FI); Jero Ahola, Lappeenranta (FI); Markku Niemelä, Helsinki (FI)

(73) Assignee: ABB Technology OY, Helsinki (FI)

(*) Notice: Subject to any disclaimer, the term of this patent is extended or adjusted under 35 U.S.C. 154(b) by 1059 days.

(21) Appl. No.: 13/741,661

(22) Filed: Jan. 15, 2013

(65) Prior Publication Data
US 2013/0185002 A1 Jul. 18, 2013

(30) Foreign Application Priority Data
Jan. 17, 2012 (EP) .................... 12151397

(51) Int. Cl.
G06F 17/00 (2006.01)
F04D 15/00 (2006.01)
F04D 27/00 (2006.01)

(52) U.S. Cl.
CPC ......... *G06F 17/00* (2013.01); *F04D 15/0088* (2013.01); *F04D 27/001* (2013.01)

(58) Field of Classification Search
CPC ...... F04D 1/00; F04D 27/001; F04D 15/0088; F04D 15/0066; F04B 15/0088;
(Continued)

(56) References Cited

U.S. PATENT DOCUMENTS

| | | | |
|---|---|---|---|
| 5,780,988 A * | 7/1998 | Kalb et al. | 347/29 |
| 5,800,331 A * | 9/1998 | Song | B04B 9/146 494/10 |
| 6,350,224 B1 * | 2/2002 | Cordaro | B04B 9/146 494/10 |
| 6,560,553 B1 * | 5/2003 | Hirobe | G01P 21/00 702/94 |

(Continued)

FOREIGN PATENT DOCUMENTS

DE 252073 A1 12/1987

OTHER PUBLICATIONS

European Search Report issued on Jun. 20, 2012, for European Application No. 12151397.

*Primary Examiner* — Manuel Rivera Vargas
*Assistant Examiner* — Jeffrey Aiello
(74) *Attorney, Agent, or Firm* — Taft Stettinius & Hollister LLP

(57) ABSTRACT

A method is provided for detecting the correct rotational direction of a centrifugal apparatus. The method includes rotating the centrifugal apparatus in a first direction, acquiring first frequency data relating to the step of rotating the centrifugal apparatus in the first direction, rotating the centrifugal apparatus in a second direction, which is opposite to the first direction, and acquiring second frequency data relating to the step of rotating the centrifugal apparatus in the second direction. The method also includes detecting the correct rotational direction of the centrifugal apparatus based on comparing the first frequency data with the second frequency data, the comparison being carried out with respect to at least one significant frequency range. In each of the at least one significant frequency range, a smaller magnitude is interpreted as an indication of the correct rotational direction.

20 Claims, 1 Drawing Sheet

(58) Field of Classification Search
CPC ...... F04B 15/0209; G01P 13/04; G01P 13/22; B60C 23/0416; B60C 23/048; G01N 2035/00495; G01N 21/07
USPC ................ 318/432, 438; 702/145, 141, 183; 73/579, 660, 659; 415/1
See application file for complete search history.

(56) References Cited

U.S. PATENT DOCUMENTS

| | | | |
|---|---|---|---|
| 6,709,240 B1* | 3/2004 | Schmalz et al. | 417/44.11 |
| 6,717,379 B1* | 4/2004 | Andersson | B06B 1/161 318/114 |
| 6,808,633 B1* | 10/2004 | Okano et al. | 210/634 |
| 6,933,693 B2* | 8/2005 | Schuchmann | 318/432 |
| 8,092,174 B2* | 1/2012 | Egedal | F03D 11/0091 416/18 |
| 2002/0176783 A1* | 11/2002 | Moeller | 417/44.11 |
| 2004/0037693 A1* | 2/2004 | Stabley et al. | 415/1 |
| 2006/0071666 A1 | 4/2006 | Unsworth et al. | |
| 2006/0266153 A1* | 11/2006 | Clary | 74/570.21 |
| 2007/0205879 A1* | 9/2007 | Matsuda | B60T 8/17616 340/438 |
| 2009/0047130 A1* | 2/2009 | Egedal | 416/61 |
| 2010/0316503 A1* | 12/2010 | Knudsen et al. | 417/45 |
| 2011/0076157 A1* | 3/2011 | Aarestrup et al. | 417/45 |
| 2011/0082663 A1* | 4/2011 | Geisler et al. | 702/141 |
| 2011/0148110 A1* | 6/2011 | Egedal et al. | 290/44 |
| 2012/0111114 A1* | 5/2012 | Emde et al. | 73/579 |
| 2012/0301972 A1* | 11/2012 | Borch et al. | 436/177 |
| 2014/0002110 A1* | 1/2014 | Adachi et al. | 324/654 |

* cited by examiner

METHOD FOR DETECTING THE CORRECT ROTATIONAL DIRECTION OF A CENTRIFUGAL APPARATUS, AND A CENTRIFUGAL APPARATUS ASSEMBLY

RELATED APPLICATIONS

This application claims priority under 35 U.S.C. §119 to European Patent Application No. 12151397.2 filed in Europe on Jan. 17, 2012, the entire content of which is hereby incorporated by reference in its entirety.

FIELD

The present disclosure relates to the detection of the correct rotational direction of a centrifugal apparatus, such as a centrifugal blower or a centrifugal pump.

BACKGROUND INFORMATION

In centrifugal apparatuses, the direction of the fluid flow is independent from the rotational direction of the centrifugal apparatus impeller. However, if the centrifugal apparatus is rotated in the wrong direction, the produced flow rate and pressure may drop dramatically compared with the correct rotational direction. This also reduces significantly the energy efficiency of the centrifugal apparatus.

The correctness of the rotational direction of a centrifugal apparatus should be checked in connection with installation of the centrifugal apparatus, and after any maintenance operation that could change the rotational direction of the centrifugal apparatus.

Traditionally, the correct rotational direction of a centrifugal apparatus is determined by visually inspecting the rotational direction. This requires additional personnel and is not an automated function. In addition, the centrifugal apparatus can be in such a position that the visual inspection is impossible to carry out.

U.S. Patent Application Publication No. 2010/0316503 discloses a pump unit which includes a rotation direction recognition module for automatic recognition of the correct rotation direction of the pump. In this publication, the value of flow rate, pressure or power is measured and compared between the reverse rotation and forward rotation cases. If there is a difference in the static state measurement signals between the forward and reverse rotational directions, the right rotational direction can be distinguished.

However, in the above-mentioned pump system, additional instrumentation might be required to be installed in to the pump system when the flow rate or pressure is used as the signal to be compared. Another drawback relates to a situation where power estimates produced by a frequency converter driving the pump are used as the signals to be compared. This drawback results from the fact that in pump systems it is not uncommon that forward and reverse rotational speeds have the same shaft power requirement. Consequently, in many cases, it is impossible to decide the correct rotational direction based on the power estimates.

SUMMARY

An exemplary embodiment of the present disclosure provides a method for detecting the correct rotational direction of a centrifugal apparatus. The exemplary method includes rotating the centrifugal apparatus in a first direction, and acquiring first frequency data relating to the step of rotating the centrifugal apparatus in the first direction. The exemplary method also includes rotating the centrifugal apparatus in a second direction, where the second direction is opposite to the first direction, and acquiring second frequency data relating to the step of rotating the centrifugal apparatus in the second direction. Essential parameters of the step of rotating the centrifugal apparatus in the second direction are compatible with essential parameters of the step of rotating the centrifugal apparatus in the first direction, and essential parameters of the step of acquiring second frequency data are compatible with essential parameters of the step of acquiring first frequency data. The exemplary method also includes detecting the correct rotational direction of the centrifugal apparatus based on comparing the first frequency data with the second frequency data, where the comparison is carried out with respect to at least one significant frequency range. In each of the at least one significant frequency range a smaller magnitude is interpreted as an indication of the correct rotational direction.

An exemplary embodiment of the present disclosure provides a centrifugal apparatus assembly which includes a centrifugal apparatus, drive means for rotating the centrifugal apparatus, and a control unit configured to control rotation of the centrifugal apparatus. The drive means include an electric motor fed by a frequency converter. The control unit is configured to control the drive means to rotate the centrifugal apparatus in a first direction, and acquire first frequency data relating to the rotation of the centrifugal apparatus in the first direction. The control unit is also configured to control the drive means to rotate the centrifugal apparatus in a second direction, which is opposite to the first direction, and acquire second frequency data relating to the rotation of the centrifugal apparatus in the second direction. Essential parameters of the rotation of the centrifugal apparatus in the second direction are compatible with essential parameters of the rotation of the centrifugal apparatus in the first direction, and essential parameters of acquiring the second frequency data are compatible with essential parameters of acquiring the first frequency data. In addition, the control unit is configured to detect the correct rotational direction of the centrifugal apparatus based on comparing the first frequency data with the second frequency data, where the comparison is carried out with respect to at least one significant frequency range. In each of the at least one significant frequency range, the control unit is configured to interpret a smaller magnitude as an indication of the correct rotational direction.

An exemplary embodiment of the present disclosure provides a non-transitory computer-readable recording medium having a computer program recorded thereon that causes a processor of a computer processing device to execute operations to detect the correct rotational direction of a centrifugal apparatus. The operations include rotating the centrifugal apparatus in a first direction, and acquiring first frequency data relating to the operation of rotating the centrifugal apparatus in the first direction. The operations also include rotating the centrifugal apparatus in a second direction, which is opposite to the first direction, and acquiring second frequency data relating to the operation of rotating the centrifugal apparatus in the second direction. Essential parameters of the operation of rotating the centrifugal apparatus in the second direction are compatible with essential parameters of the operation of rotating the centrifugal apparatus in the first direction, and essential parameters of the operation of acquiring second frequency data are compatible with essential parameters of the operation of acquiring first frequency data. The operations also include detecting the correct rotational direction of the centrifugal apparatus based on comparing the first frequency data with the second frequency data, where the comparison is carried out with respect to at least one significant frequency range. In each of the at least one significant frequency range a smaller magnitude is interpreted as an indication of the correct rotational direction.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
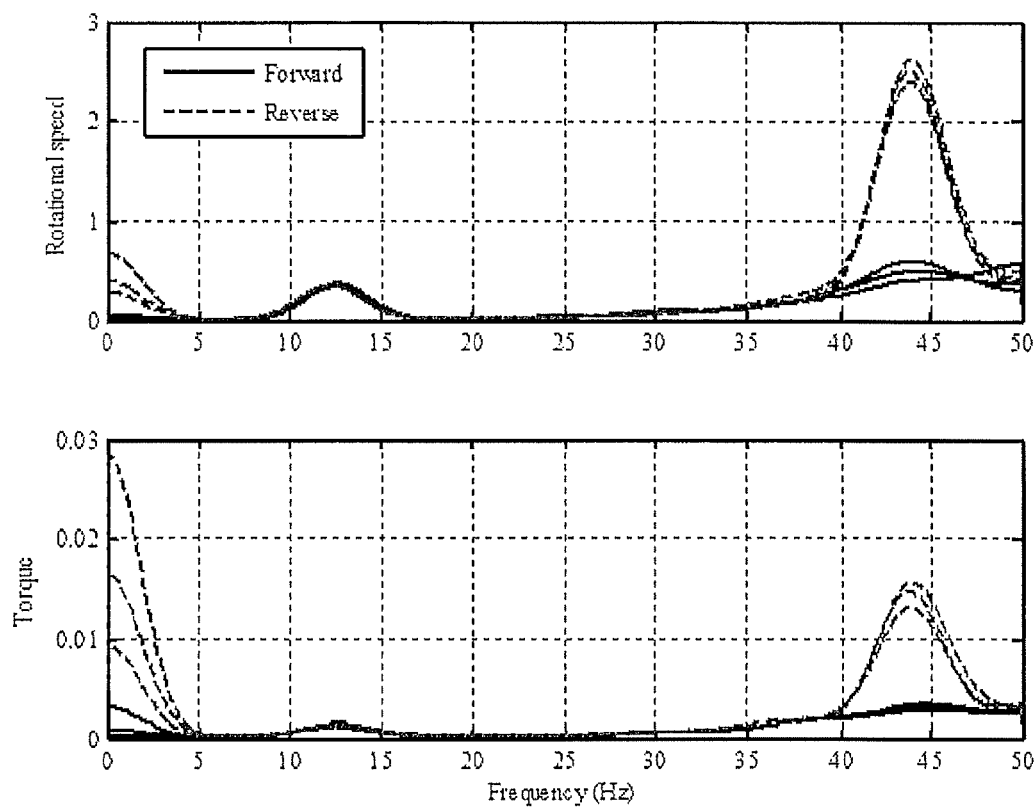
FIG. 1 shows frequency spectra of rotational speed estimate and torque estimate for a centrifugal apparatus.

Exemplary embodiments of the present disclosure provide a method for detecting the correct rotational direction of a centrifugal apparatus and a centrifugal apparatus assembly for implementing the method. The exemplary method and apparatus of the present disclosure overcome the drawbacks discussed above.

Exemplary embodiments of the present disclosure are based on the realization that the correct rotational direction of a centrifugal apparatus can be detected by comparing first frequency data relating to rotation of the centrifugal apparatus in a first direction with second frequency data relating to rotation of the centrifugal apparatus in a second direction, where the comparison is carried out with respect to at least one significant frequency range.

When a centrifugal apparatus is rotating in a forward direction, the angle of attack between the fluid and the impeller blade is such that in normal operating conditions the impeller blades do not stall. In the case of reverse rotation, the angle of attack increases and it is very likely that the impeller blades stall. The stalling causes uneven loading conditions which can be detected in shaft power requirement of the centrifugal apparatus.

An advantage of the present disclosure is that the correct rotational direction of a centrifugal apparatus rotated by a modern frequency converter can be detected without any additional instrumentation. This is based on a fact that modern frequency converters are able to estimate the induction motor load conditions using internal current, voltage and switch position measurements in connection with a motor model. These load condition estimates include among other things rotational speed and torque estimates.

The method of the present disclosure can be combined with methods presented in European Patent Application 11189925.8, the entire disclosure of which is hereby incorporated by reference in its entirety. Combining the methods further enhances the reliability of the detection.

In accordance with an exemplary embodiment, a method according to present disclosure for detecting the correct rotational direction of a centrifugal apparatus includes the steps of: rotating the centrifugal apparatus in a first direction; acquiring first frequency data relating to the step of rotating the centrifugal apparatus in the first direction; rotating the centrifugal apparatus in a second direction, which is opposite to the first direction; acquiring second frequency data relating to the step of rotating the centrifugal apparatus in the second direction; and detecting the correct rotational direction of the centrifugal apparatus based on comparing the first frequency data with the second frequency data, where the comparison is carried out in respect of at least one significant frequency range. In each of the at least one significant frequency range, a smaller magnitude is interpreted as indication of the correct rotational direction.

Essential parameters of the step of rotating the centrifugal apparatus in the second direction are compatible with essential parameters of the step of rotating the centrifugal apparatus in the first direction, and essential parameters of the step of acquiring second frequency data are compatible with essential parameters of the step of acquiring first frequency data.

Essential parameters of a step of rotating a centrifugal apparatus depend on characteristics of centrifugal apparatus assembly. In accordance with an exemplary embodiment, the essential parameters of a step of rotating a centrifugal apparatus include a rotational speed reference and a flow rate setting, in which case a first direction rotating event and corresponding second direction rotating event have the same rotational speed reference and the same flow rate setting.

Essential parameters of a step of acquiring frequency data may include a sampling period and a sampling frequency. In accordance with an exemplary embodiment, sampling period and sampling frequency are the same in the step of acquiring second frequency data and in the step of acquiring first frequency data.

In accordance with an exemplary embodiment, the correct rotational direction of a centrifugal apparatus powered by a modern frequency converter is detected by analyzing low frequency fluctuation of shaft power requirement of the centrifugal apparatus. In this embodiment, the at least one significant frequency range includes a low frequency range. First, the centrifugal apparatus is rotated in a first direction, and frequency converter estimates of the rotational speed $n_{1,est}$ and torque $T_{1,est}$ are saved from a sufficient time span and sufficient sampling frequency (e.g., 15 seconds and 100 Hz, respectively). Secondly, the centrifugal apparatus is rotated in a second direction, the second direction being opposite to the first direction, and frequency converter estimates of the rotational speed $n_{2,est}$ and torque $T_{2,est}$ are saved from the same time span.

During the steps of rotating the centrifugal apparatus in the first direction and in the second direction, a reference instruction for the frequency converter is kept substantially constant. The reference instruction for the frequency converter may include a speed reference. Alternatively, the reference instruction for the frequency converter may include a torque reference.

Mean values of signals $n_{1,est}$, $T_{1,est}$, $n_{2,est}$ and $T_{2,est}$ are removed so that the bias does not have an effect on the rest of the procedure. The resulting variables are $\hat{n}_1$, $\hat{T}_1$, $\hat{n}_2$, and $\hat{T}_2$ respectively. As an example for the first direction and estimate $n_{1,est}$ this can be done with $$\hat{n}_1(k) = n_{1,est}(k) - \frac{1}{N}\sum_{k=0}^{N-1}(n_{1,est}(k)), \qquad (1)$$

where N is the number of samples in $n_{1,est}$ and k is the discrete time index (0, 1, 2, ..., N).

Signals $\hat{n}_1$, $\hat{T}_1$, $\hat{n}_2$, and $\hat{T}_2$ are treated so that only the low frequency components (e.g., 0-1 Hz) are visible. This can be done in various ways, for example, by decimation or filtering. In the present example, the signals are treated by filtering. The filtered estimates are referred to as $\hat{n}_{1,filt}$, $\hat{T}_{1,filt}$, $\hat{n}_{2,filt}$, and $\hat{T}_{2,filt}$.

From these filtered estimates, a root mean square value for the time domain fluctuation is calculated. The root mean square value $RMS_{n1}$ for $\hat{n}_{1,filt}$ can be calculated with $$RMS_{n1} = \sqrt{\frac{1}{M} \sum_{k=0}^{M-1} \hat{n}_{1,filt}^2(k)}. \qquad (2)$$

After root mean square values $RMS_{n1}$, $RMS_{T1}$, $RMS_{n2}$ and $RMS_{T2}$ have been calculated, they are compared with each other. There are two basic scenarios as a result of the comparison.

Case 1: $RMS_{n2} > RMS_{n1}$ is true and $RMS_{T2} > RMS_{T1}$ is true. This means that the low frequency fluctuation of the second direction is greater, thus the second direction is the reverse direction, or the incorrect direction. Also, in this case, the first direction is the forward direction, or the correct direction. Respectively, if $RMS_{n2} < RMS_{n1}$ is true and $RMS_{T2} < RMS_{T1}$ is true, then the second direction is the forward direction.

Case 2: $RMS_{n2} > RMS_{n1}$ is true and $RMS_{T2} > RMS_{T1}$ is false. This means that there is no distinct direction that is indicated to be the forward rotational direction. Correspondingly, when $RMS_{n2} > RMS_{n1}$ is false and $RMS_{T2} > RMS_{T1}$ is true, there is no distinct forward rotational direction.

Using only a single measurement may lead to a misinterpretation. In accordance with an exemplary embodiment, in order to improve reliability of the step of detecting the correct rotational direction of a centrifugal apparatus, the step of rotating the centrifugal apparatus in a first direction includes a plurality of separate first direction rotating events, and the step of rotating the centrifugal apparatus in a second direction includes a separate second direction rotating event for each of the plurality of separate first direction rotating events.

The plurality of separate first direction rotating events may include a number of events in each one of which the centrifugal apparatus is rotated with a different rotational speed reference while a flow rate setting of the centrifugal apparatus is substantially the same. The rotational speed references used for the test can be, for example, references corresponding to 60, 70, 80, 90 and 100% of the nominal rotational speed of the centrifugal apparatus. For a centrifugal apparatus with a nominal rotational speed of 1450 rpm, this would correspond to rotational speed references of 870, 1015, 1160, 1305 and 1450 rpm. The correct rotational direction may be decided based on a majority rule from the results of the individual rotation event pairs.

Further, the plurality of separate first direction rotating events may include a number of events in each one of which the centrifugal apparatus is rotated with a different flow rate setting while a rotational speed reference of the centrifugal apparatus is substantially the same. The flow rate settings used for the test can be, for example, flow rate settings corresponding to 0, 70, 100, and 120% of the nominal flow rate of the centrifugal apparatus. The correct rotational direction may be decided based on a majority rule from the results of the individual rotation event pairs.

The expression "flow rate setting" refers herein to flow resistance in the flow channel of centrifugal apparatus assembly. For example, a certain flow rate setting generates with the correct rotational direction a flow rate corresponding to nominal flow rate of the centrifugal apparatus. It is clear that the same flow rate setting generates with the incorrect rotational direction a flow rate which is substantially less than the nominal flow rate of the centrifugal apparatus. Changing flow rate settings between rotation events is practical, for example, in embodiments where a flow channel of centrifugal apparatus assembly includes an adjustable valve controlled by the control unit of the centrifugal apparatus assembly.

In accordance with an exemplary embodiment, the at least one significant frequency range includes a supply frequency range containing a supply frequency at which power is supplied to a motor driving the centrifugal apparatus. In such an embodiment, band-pass filtering may be used. In the band-pass filtering process signals $\hat{n}'_1$, $\hat{T}'_1$, $\hat{n}'_2$, and $\hat{T}'_2$ are treated so that only frequency components adjacent the supply frequency are visible. In accordance with an exemplary embodiment, it is possible to examine a single supply frequency point. In that case, the single frequency point is interpreted as a special case of a supply frequency range.

In embodiments involving band-pass filtering, equations 1 and 2 may be used to calculate root mean square values for filtered estimates $\hat{n}'_{1,filt}$, $\hat{T}'_{1,filt}$, $\hat{n}'_{2,filt}$, and $\hat{T}'_{2,filt}$. After root mean square values $RMS'_{n1}$, $RMS'_{T1}$, $RMS'_{n2}$ and $RMS'_{T2}$ have been calculated, they may be compared with each other in the same way as explained above.

In accordance with an exemplary embodiment of the present disclosure, a frequency spectrum of rotational speed estimate and/or torque estimate is used for detecting the correct rotational direction of a centrifugal apparatus. FIG. 1 shows frequency spectra of rotational speed estimate and torque estimate for a centrifugal apparatus rotated in the forward and reverse directions. FIG. 1 includes data from three first direction rotating events and from three second direction rotating events. Mean values of the rotational speed signals and torque signals have been removed. A supply frequency is 44 Hz.

FIG. 1 shows that each frequency spectrum includes two significant frequency ranges. The first significant frequency range is a low frequency range and the second significant frequency range is a supply frequency range. In FIG. 1, the low frequency range includes frequencies from 0 Hz to approximately 5 Hz, and the supply frequency range includes frequencies from approximately 40 Hz to approximately 48 Hz. Frequencies outside the low frequency range and the supply frequency range are in practice insignificant for detecting the correct rotational direction of the centrifugal apparatus.

In FIG. 1, each graph relating to forward direction is substantially lower than the corresponding graph relating to reverse direction in the significant frequency ranges. Therefore, the correct rotational direction of the centrifugal apparatus could have been detected based on any one of the depicted tests including a first direction rotating event and a second direction rotating event.

Instead of frequency spectrum of rotational speed estimate and/or torque estimate, a power spectral density (PSD) may be used to detect the correct rotational direction of a centrifugal apparatus. A power spectral density describes how the power of a signal is distributed with frequency. The correct rotational direction of a centrifugal apparatus can be detected from a power spectral density in a similar way than from a frequency spectrum of rotational speed estimate or from a frequency spectrum of torque estimate. This means that a smaller magnitude in at least one significant frequency range indicates the correct rotational direction.

When a frequency spectrum of rotational speed estimate, a frequency spectrum of torque estimate or a power spectral density is used for detecting the correct rotational direction of a centrifugal apparatus, the method may include treating raw signals for example by decimation or filtering.

A smaller magnitude in at least one significant frequency range may be detected by a suitable known mathematical method. The mathematical method may be implemented by a computer. Consequently, the entire method for detecting the correct rotational direction of a centrifugal apparatus may be automated by a processor of the computer executing a computer program that is tangibly recorded on a non-transitory computer-readable recording medium (e.g., a non-volatile memory such as a ROM, hard disk drive, flash memory, optical memory, etc.). Alternatively, a smaller magnitude in at least one significant frequency range may be detected visually from a graph.

In most embodiments, a smaller magnitude in a significant frequency range can be concluded based on a peak value. In some embodiments, however, a significant frequency range of the correct rotational direction may have a peak value that is higher than a peak value of the incorrect rotational direction. In these embodiments, an integration process of some type may be used to detect the correct rotational direction. Naturally, an integration process also gives the correct answer in embodiments where a significant frequency range of the correct rotational direction has a peak value that is smaller than a peak value of the incorrect rotational direction. Further, the above described filtering and calculation of root mean square values also facilitates ignoring erroneous peak values.

A method according to present disclosure for detecting the correct rotational direction of a centrifugal apparatus may include a step of rotating the centrifugal apparatus in the correct rotational direction after the correct rotational direction has been detected. Also, this step may be automated. In accordance with an exemplary embodiment, a centrifugal apparatus assembly performs, as a response to a press of a button, a method for detecting the correct rotational direction of a centrifugal apparatus, and subsequently starts to rotate the centrifugal apparatus in the correct rotational direction.

As used herein, a centrifugal apparatus is an apparatus having an impeller and adapted to move fluids, such as liquids, gases or slurries. For example, a centrifugal apparatus may be a centrifugal blower configured to move gases or a centrifugal pump adapted to move liquids. The rotational direction of a centrifugal apparatus means the rotational direction of the impeller of the centrifugal apparatus.

In accordance with an exemplary embodiment, the centrifugal apparatus has an impeller with backward-curved blades. In accordance with another exemplary embodiment, the centrifugal apparatus may have an impeller with forward-curved blades or with straight radial blades.

It should be understood that parameters of a method for detecting the correct rotational direction of a centrifugal apparatus may vary depending on the type of the centrifugal apparatus and characteristics of the centrifugal apparatus. For example, in some embodiments a low frequency range may include only frequencies 0-1 Hz, while frequencies above 1 Hz and below a supply frequency range include practically no information relating to the correct rotational direction.

Figure 2:
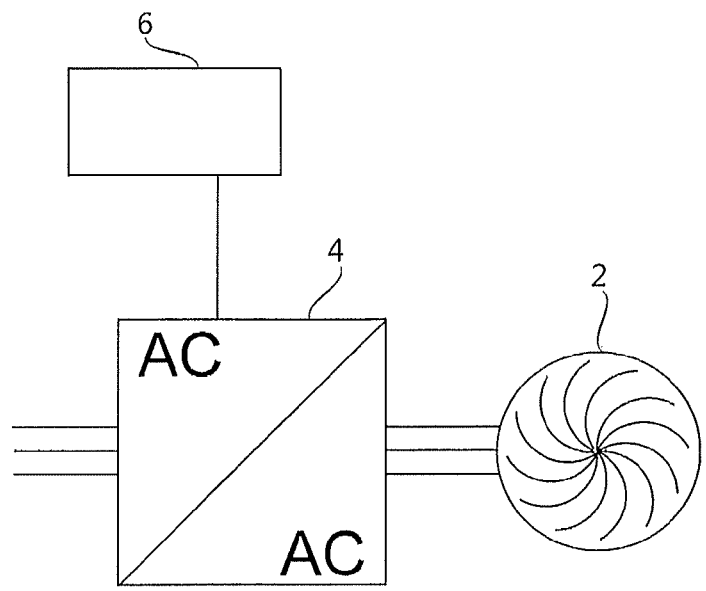
FIG. 2 shows a centrifugal apparatus assembly according to an exemplary embodiment of present disclosure.

FIG. 2 shows a centrifugal apparatus assembly according to an exemplary embodiment of the present disclosure. The centrifugal apparatus assembly includes a centrifugal apparatus 2, a drive means 4 for rotating the centrifugal apparatus 2, and a control unit 6 for controlling rotation of the centrifugal apparatus 2. The control unit 6 is configured to detect the correct rotational direction of the centrifugal apparatus 2 by using a method according to the present disclosure. The drive means 4 includes a frequency converter.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for detecting the correct rotational direction of a centrifugal apparatus, the method comprising:
   rotating the centrifugal apparatus in a first direction;
   acquiring first frequency data relating to the step of rotating the centrifugal apparatus in the first direction;
   rotating the centrifugal apparatus in a second direction, the second direction being opposite to the first direction;
   acquiring second frequency data relating to the step of rotating the centrifugal apparatus in the second direction, wherein essential parameters of the step of rotating the centrifugal apparatus in the second direction are compatible with essential parameters of the step of rotating the centrifugal apparatus in the first direction, and essential parameters of the step of acquiring second frequency data are compatible with essential parameters of the step of acquiring first frequency data;
   detecting a correct rotational direction of the centrifugal apparatus based on comparing the first frequency data with the second frequency data, the comparison being carried out with respect to at least one frequency range; and
   controlling the centrifugal apparatus to rotate in the detected correct rotational direction of the centrifugal apparatus,
   wherein in each of the at least one frequency range a smaller magnitude is interpreted as an indication of the correct rotational direction.

2. A method according to claim 1, wherein the step of rotating the centrifugal apparatus in the first direction comprises a plurality of separate first direction rotating events, and
   wherein the step of rotating the centrifugal apparatus in the second direction comprises a separate second direction rotating event for each of the plurality of separate first direction rotating events.

3. A method according to claim 2, wherein the plurality of separate first direction rotating events comprises a number of events in each one of which the centrifugal apparatus is rotated with a different rotational speed reference while a flow rate setting of the centrifugal apparatus is substantially the same.

4. A method according to claim 2, wherein the plurality of separate first direction rotating events comprises a number of events in each one of which the centrifugal apparatus is rotated with a different flow rate setting while a rotational speed reference of the centrifugal apparatus is substantially the same.

5. A method according to claim 3, wherein the plurality of separate first direction rotating events comprises a number of events in each one of which the centrifugal apparatus is rotated with a different flow rate setting while a rotational speed reference of the centrifugal apparatus is substantially the same.

6. A method according to claim 1, wherein the step of detecting the correct rotational direction comprises forming frequency spectra of the first frequency data and the second frequency data for the at least one frequency range, and comparing magnitudes of the frequency spectra.

7. A method according to claim 1, wherein the step of detecting the correct rotational direction comprises:
removing the mean value of the first frequency data and the second frequency data to provide processed first frequency data and processed second frequency data;
treating the processed first frequency data and the processed second frequency data to provide treated first frequency data and treated second frequency data, respectively, the treated first frequency data and the treated second frequency data include only the at least one frequency range; and
calculating a root mean square value for the treated first frequency data and the treated second frequency data;
wherein the step of detecting the correct rotational direction of the centrifugal apparatus is based on comparing the root mean square value of the treated first frequency data with the root mean square value of the treated second frequency data,
wherein a lower root mean square value indicates the correct rotational direction.

8. A method according to claim 1, wherein the at least one frequency range comprises a low frequency range located within a range of 0-5 Hz.

9. A method according to claim 1, wherein the at least one frequency range comprises a supply frequency range containing a supply frequency at which power is supplied to a motor driving the centrifugal apparatus, a width of the supply frequency range being less than or equal to 10 Hz.

10. A method according to claim 1, wherein the centrifugal apparatus is driven by an electric motor fed by a frequency converter having a plurality of controllable switches, the first frequency data and the second frequency data comprising at least one load condition estimate formed based on current, voltage and switch positions of the frequency converter.

11. A method according to claim 10, wherein the first frequency data comprises estimated rotational speed of the centrifugal apparatus in the first direction, and the second frequency data comprises estimated rotational speed of the centrifugal apparatus in the second direction.

12. A method according to claim 10, wherein the first frequency data comprises estimated torque of the centrifugal apparatus in the first direction, and the second frequency data comprises estimated torque of the centrifugal apparatus in the second direction.

13. A method according to claim 10, wherein during each first direction rotating event and each second direction rotating event, a reference instruction for the frequency converter is kept substantially constant, the reference instruction for the frequency converter comprising a speed reference or a torque reference.

14. A method according to claim 1, wherein the first frequency data and the second frequency data relate to fluctuation of shaft power of the centrifugal apparatus.

15. A centrifugal apparatus assembly comprising:
a centrifugal apparatus;
drive means for rotating the centrifugal apparatus; and
a control unit configured to control rotation of the centrifugal apparatus,
wherein the drive means include an electric motor fed by a frequency converter, and
wherein the control unit is configured to:
control the drive means to rotate the centrifugal apparatus in a first direction;
acquire first frequency data relating to the rotation of the centrifugal apparatus in the first direction;
control the drive means to rotate the centrifugal apparatus in a second direction, the second direction being opposite to the first direction;
acquire second frequency data relating to the rotation of the centrifugal apparatus in the second direction, wherein essential parameters of the rotation of the centrifugal apparatus in the second direction are compatible with essential parameters of the rotation of the centrifugal apparatus in the first direction, and essential parameters of acquiring the second frequency data are compatible with essential parameters of acquiring the first frequency data; and
detect a correct rotational direction of the centrifugal apparatus based on comparing the first frequency data with the second frequency data, the comparison being carried out with respect to at least one frequency range, wherein in each of the at least one frequency range, the control unit is configured to interpret a smaller magnitude as an indication of the correct rotational direction.

16. A centrifugal apparatus assembly according to claim 15, wherein the centrifugal apparatus is a centrifugal blower configured to move gases or a centrifugal pump adapted to move liquids.

17. A centrifugal apparatus assembly according to claim 15, wherein the control unit is configured to control the drive means to rotate the centrifugal apparatus in the detected correct rotational direction of the centrifugal apparatus.

18. A centrifugal apparatus assembly according to claim 15, wherein the first frequency data and the second frequency data relate to fluctuation of shaft power of the centrifugal apparatus.

19. A centrifugal apparatus assembly according to claim 15, wherein the centrifugal apparatus is one of (i) a centrifugal blower configured to move gases and (ii) a centrifugal pump adapted to move liquids, and
wherein the first frequency data and the second frequency data relate to fluctuation of shaft power of the centrifugal apparatus.

20. A non-transitory computer-readable recording medium having a computer program recorded thereon that causes a processor of a computer processing device to execute operations to detect the correct rotational direction of a centrifugal apparatus, the operations comprising:
rotating the centrifugal apparatus in a first direction;
acquiring first frequency data relating to the operation of rotating the centrifugal apparatus in the first direction;
rotating the centrifugal apparatus in a second direction, the second direction being opposite to the first direction;
acquiring second frequency data relating to the operation of rotating the centrifugal apparatus in the second direction, wherein essential parameters of the operation of rotating the centrifugal apparatus in the second direction are compatible with essential parameters of the operation of rotating the centrifugal apparatus in the first direction, and essential parameters of the operation of acquiring second frequency data are compatible with essential parameters of the operation of acquiring first frequency data;

detecting a correct rotational direction of the centrifugal apparatus based on comparing the first frequency data with the second frequency data, the comparison being carried out with respect to at least one frequency range, and controlling the centrifugal apparatus to rotate in the detected correct rotational direction of the centrifugal apparatus, wherein in each of the at least one frequency range a smaller magnitude is interpreted as an indication of the correct rotational direction.

* * * * *